US010347170B2

(12) United States Patent
Eun

(10) Patent No.: US 10,347,170 B2
(45) Date of Patent: Jul. 9, 2019

(54) METHOD OF RECOVERING ERROR IN DATA COMMUNICATION, DATA COMMUNICATION SYSTEM PERFORMING THE SAME AND DISPLAY APPARATUS INCLUDING THE DATA COMMUNICATION SYSTEM

(71) Applicant: Samsung Display Co., LTD., Yongin-si, Gyeonggi-do (KR)

(72) Inventor: Dong-Ki Eun, Suwon-si (KR)

(73) Assignee: Samsung Display Co., Ltd. (KR)

( * ) Notice: Subject to any disclaimer, the term of this patent is extended or adjusted under 35 U.S.C. 154(b) by 155 days.

(21) Appl. No.: 15/415,486

(22) Filed: Jan. 25, 2017

(65) Prior Publication Data

US 2017/0221409 A1 Aug. 3, 2017

(30) Foreign Application Priority Data

Jan. 28, 2016 (KR) .......................... 10-2016-0010396

(51) Int. Cl.
*G09G 3/20* (2006.01)

(52) U.S. Cl.
CPC ..... *G09G 3/2096* (2013.01); *G09G 2310/027* (2013.01); *G09G 2310/08* (2013.01); *G09G 2370/08* (2013.01)

(58) Field of Classification Search
CPC ............... G09G 3/2096; G09G 3/3611; G09G 2320/041; G09G 2370/08; G09G 2370/00; G06F 13/18; H04L 7/0016
See application file for complete search history.

(56) References Cited

U.S. PATENT DOCUMENTS

| 2009/0157929 | A1* | 6/2009 | Pigott | G06F 13/4291 710/110 |
| 2012/0331196 | A1* | 12/2012 | Erickson | G06F 11/0745 710/110 |
| 2014/0229644 | A1* | 8/2014 | Thanigasalam | G06F 13/24 710/110 |
| 2015/0081936 | A1 | 3/2015 | Low et al. | |
| 2015/0205753 | A1* | 7/2015 | Burnette | G06F 13/4286 710/106 |
| 2017/0097912 | A1* | 4/2017 | Takahashi | G06F 13/364 |
| 2017/0104607 | A1* | 4/2017 | Sengoku | H04L 12/40019 |
| 2017/0104655 | A1* | 4/2017 | Takahashi | H04L 1/0063 |

* cited by examiner

*Primary Examiner* — Bryan Earles
(74) *Attorney, Agent, or Firm* — Innovation Counsel LLP

(57) ABSTRACT

A method of recovering an error in data communication according to an exemplary embodiment of the present inventive concept includes performing data communication between a first device and a second device through a data line and a clock line; detecting a communication error in the data communication when the first device is in an output mode; and in response to the detecting, outputting, by the second device, a stop signal to the data line repeatedly until the first device is in an input mode. According to exemplary embodiments, if a device stays in an output mode due to a communication error, a stop signal is repeatedly output to the device until the device switches to an input mode, whereupon the communication error can be recovered from. Thus, quality of data communication can be improved.

20 Claims, 7 Drawing Sheets

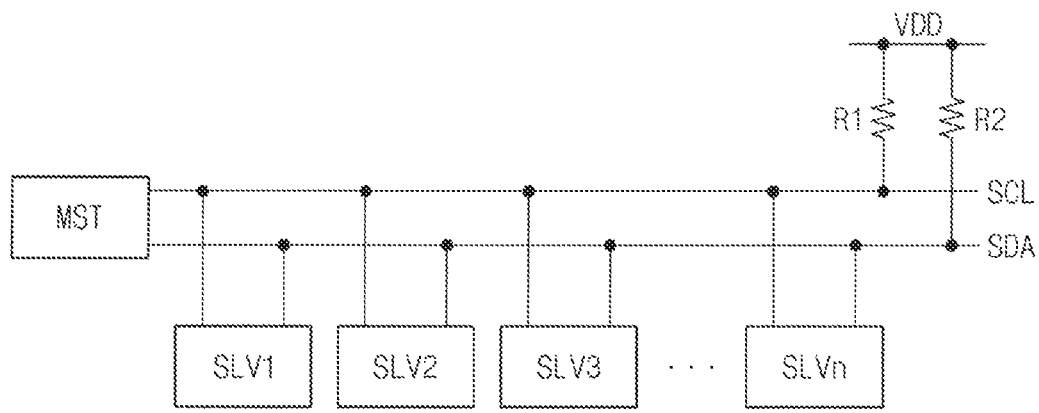
FIG. 2
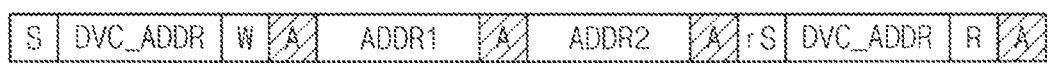
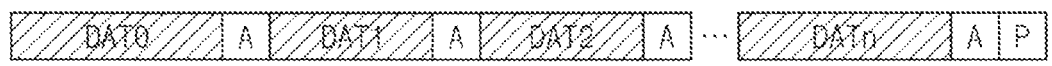

FIG. 6
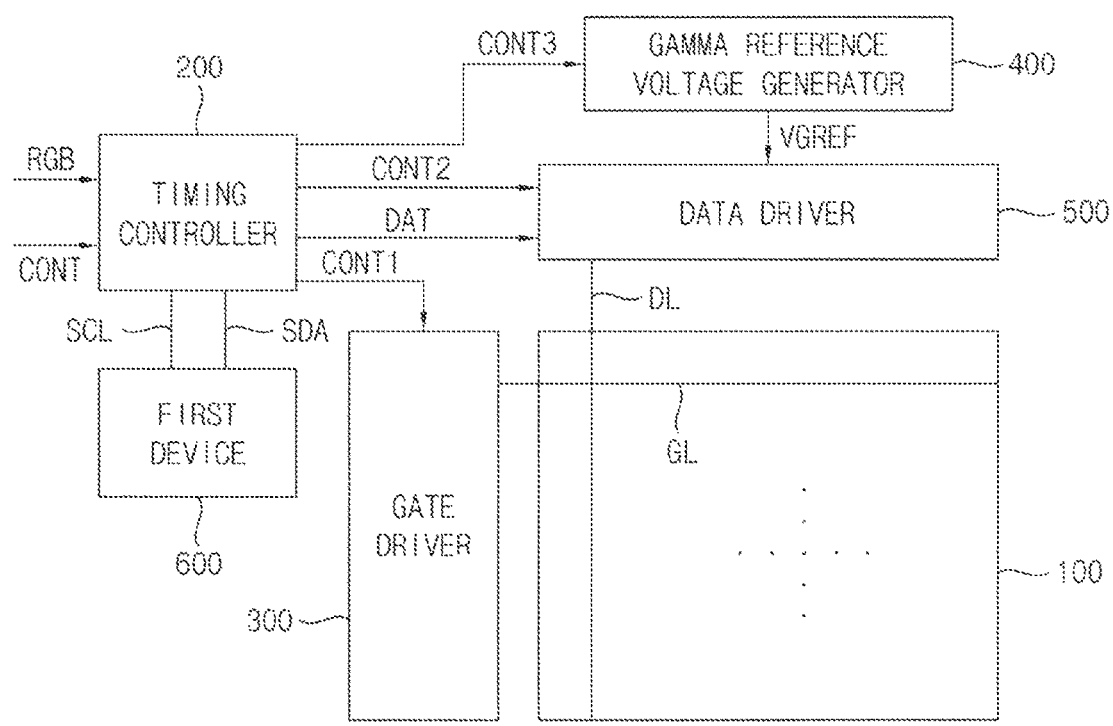
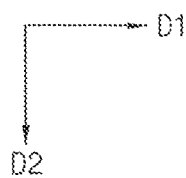

METHOD OF RECOVERING ERROR IN DATA COMMUNICATION, DATA COMMUNICATION SYSTEM PERFORMING THE SAME AND DISPLAY APPARATUS INCLUDING THE DATA COMMUNICATION SYSTEM

CROSS-REFERENCE TO RELATED APPLICATION

This application claims priority under 35 U.S.C. § 119 to Korean Patent Application No. 10-2016-0010396 filed on Jan. 28, 2016 in the Korean Intellectual Property Office (KIPO), the contents of which are herein incorporated by reference in their entireties.

BACKGROUND

1. Technical Field

Exemplary embodiments of the present inventive concept relate generally to data communications, and more particularly to methods of recovering errors in data communication, data communication systems performing the methods, and display apparatuses including the data communication systems.

2. Description of the Related Art

Generally, data communication devices receiving data such as a video signal and an audio signal, use a Universal Asynchronous Receiver Transmitter (UART) communication or an Inter-Integrated Circuit (IIC) communication system.

The IIC communication hardware transmits data between devices through a clock line and a data line. For example, IIC communication is used in a data transmission between a CPU, a memory and an I/O device, and may perform data communication with two lines, which transmit a data signal and a clock signal respectively.

The IIC communication system has found wide acceptance. For example, IIC communication may be used in data communication between a timing controller and sensors in a display apparatus.

SUMMARY

Exemplary embodiments of the present inventive concept provide a method of recovering an error in data communication, so as to improve display quality.

Exemplary embodiments of the present inventive concept provide a data communication system performing the method.

Exemplary embodiments of the present inventive concept provide a display apparatus including the data communication system.

A method of recovering an error in data communication according to an exemplary embodiment of the present inventive concept includes performing data communication between a first device and a second device through a data line and a clock line; detecting a communication error in the data communication when the first device is in an output mode; and in response to the detecting, outputting, by the second device, a stop signal to the data line repeatedly until the first device is in an input mode if the communication error occurs.

In an exemplary embodiment, the first device may be configured to output data to the data line when the first device is in the output mode.

In an exemplary embodiment, the first device may be configured to receive data from the data line when the first device is in the input mode.

In an exemplary embodiment, the outputting may further comprise outputting, by the second device, a clock signal to the clock line.

In an exemplary embodiment, the outputting may further comprise outputting, by the second device, the stop signal to the data line in synchronous manner with clock pulses of the clock signal.

In an exemplary embodiment, the outputting may further comprise periodically and repeatedly outputting stop during a first duration after the communication error is detected.

In an exemplary embodiment, the method may further comprise receiving, by the first device, the stop signal so as to switch from the output mode to the input mode.

In an exemplary embodiment, the data communication may be an Inter-Integrated Circuit (IIC) communication.

In an exemplary embodiment, the first device may be a slave device and the second device may be a master device.

A data communication system according to an exemplary embodiment of the present inventive concept includes first and second devices configured to perform data communication with each other through a data line and a clock line. In response to an error in the data communication while the first device is in an output mode, the second device is configured to output a stop signal to the data line repeatedly until the first device is switched to an input mode.

In an exemplary embodiment, the first device may be configured to output data to the data line when the first device is in the output mode.

In an exemplary embodiment, the first device may be configured to receive data from the data line when the first device is in the input mode.

In an exemplary embodiment, the data communication may be an Inter-Integrated Circuit (IIC) communication.

In an exemplary embodiment, the first device may be a slave device and the second device may be a master device.

A display apparatus according to an exemplary embodiment of the present inventive concept includes a first device configured to generate data and configured to perform data communication with a timing controller through a data line and a clock line; a timing controller configured to, in response to an error in the data communication while the first device is in an output mode, output a stop signal to the data line repeatedly until the first device is switched to an input mode; and a display panel configured to display an image based on the data.

In an exemplary embodiment, the first device may be configured to output data to the data line when the first device is in the output mode.

In an exemplary embodiment, the first device may be configured to receive data from the data line when the first device is in the input mode.

In an exemplary embodiment, the data communication may be an Inter-Integrated Circuit (IIC) communication.

In an exemplary embodiment, the first device may be a slave device and the second device may be a master device.

In an exemplary embodiment, the first device may be one of a temperature sensor configured to sense temperature of the display panel, a light sensor configured to sense an amount of light of the display panel, an analog to digital converter (ADC), and a digital to analog converter (DAC) for facilitating a measuring of a current or a voltage of the display panel.

According to exemplary embodiments, if a device stays in an output mode to a line due to a communication error, a stop signal is repeatedly output to the device until the device switches to an input mode to recover the communication error. Thus, quality of data communication can be improved.

BRIEF DESCRIPTION OF THE DRAWINGS

The above and other features and advantages of the present inventive concept will become more apparent by describing in detailed exemplary embodiments thereof with reference to the accompanying drawings, in which:

FIG. 1 is a circuit diagram illustrating a data communication system according to exemplary embodiments;

FIG. 2 is a diagram illustrating data signals transmitted between devices in a data communication system constructed according to exemplary embodiments;

FIG. 6 is a block diagram illustrating a display apparatus constructed according to exemplary embodiments.

DETAILED DESCRIPTION OF EMBODIMENTS

Figure 3A:
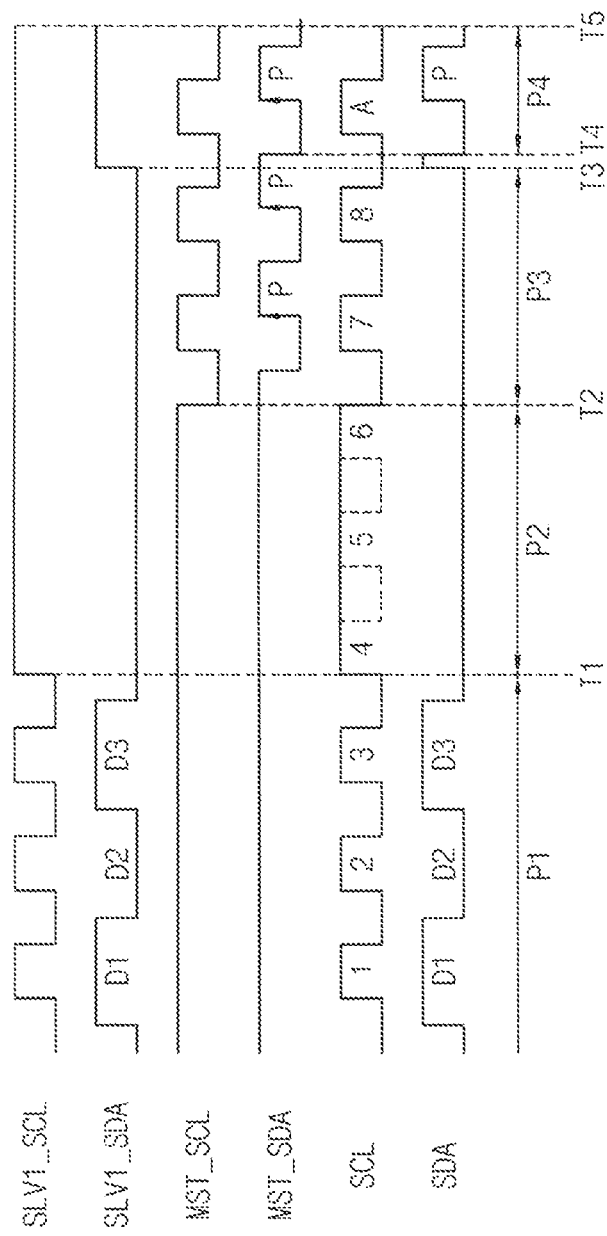
FIG. 3A is a diagram illustrating an example of data signals and clock signals when a communication error occurs in a data communication system constructed according to exemplary embodiments.

Hereinafter, the present inventive concept will be explained in detail with reference to the accompanying drawings. All numerical values are approximate, and may vary. All examples of specific materials and compositions are to be taken as nonlimiting and exemplary only. Other suitable materials and compositions may be used instead.

FIG. 1 is a circuit diagram illustrating a data communication system according to exemplary embodiments.

Referring to FIG. 1, a data communication system includes a master device MST and a plurality of slave devices SLV1~SLVn. The data communication system further includes a data line SDA and a clock line SCL.

The master device MST and the slave devices SLV1~SLVn are connected to the data line SDA and the clock line SCL. The data communication system may further include a first resistor R1 and a second resistor R2. The first resistor R1 may be connected between a voltage source VDD and the clock line SCL. The second resistor R2 may be connected between the voltage source VDD and the data line SDA.

The master device MST and the slave devices SLV1~SLV2 perform data communication with each other. The data communication may be performed according to Inter-Integrated Circuit (IIC) communication.

The master device MST may output a data signal to the data line SDA. The master device MST may occupy the data line SDA while outputting the data signal to the data line SDA. The master device MST may be in an output mode to the data line SDA when the master device MST occupies the data line SDA. In other words, the master device MST is able to output the data signal to the data line SDA. In this case, the slave devices SLV1~SLVn may release the data line SDA. The slave devices SLV1~SLVn may be in an input mode to the data line SDA once the slave devices SLV1~SLVn release the data line SDA. In other words, the slave devices SLV1~SLVn are able to receive the data signal from the data line SDA.

Alternatively, the slave devices SLV1~SLVn may output a data signal to the data line SDA. The slave devices SLV1~SLVn may occupy the data line SDA while outputting the data signal to the data line SDA. The slave devices SLV1~SLVn may be in an output mode to the data line SDA when the slave devices SLV1~SLVn occupy the data line SDA. In other words, the slave devices SLV1~SLVn are able to output the data signal to the data line SDA. In this case, the master device MST may release the data line SDA. The master device MST may be in an input mode to the data line SDA when the master device MST releases the data line SDA. In other words, the master device MST is able to receive the data signal from the data line SDA.

The master device MST may output a clock signal to the clock line SCL. The master device MST may occupy the clock line SCL while outputting the clock signal to the clock line SCL. The master device MST may be in output mode to the clock line SCL when the master device MST occupies the clock line SCL. In other words, the master device MST is able to output the clock signal to the clock line SCL. In this case, the slave devices SLV1~SLVn may release the clock line SCL. The slave devices SLV1~SLVn may be in input mode to the clock line SCL when the slave devices SLV1~SLVn releases the clock line SCL. In other words, the slave devices SLV1~SLVn are able to receive the clock signal from the clock line SCL.

Alternatively, the slave devices SLV1~SLVn may output a clock signal to the clock line SCL. The slave devices SLV1~SLVn may occupy the clock line SCL while outputting the clock signal to the clock line SCL. The slave devices SLV1~SLVn may be in output mode when the slave devices SLV1~SLVn occupy the clock line SCL. In other words, the slave devices SLV1~SLVn are able to output the clock signal to the clock line SCL. In this case, the master device MST may release the clock line SCL. The master device MST may be in input mode to the clock line SCL when the master device MST releases the clock line SCL. In other words, the master device MST is able to receive the clock signal from the clock line SCL.

Data communication performed between the master device MST and a first slave device SLV1, and data signals that the master device MST and the first slave device SLV1 output, will be explained in further detail with reference to FIG. 2.

FIG. 2 is a diagram illustrating data signals transmitted between devices in a data communication system constructed according to exemplary embodiments. More specifically, FIG. 2 is a diagram illustrating data signals transmitted between the master device MST and the first slave device SLV1.

Referring to FIGS. 1 and 2, the master device MST is in output mode during an unshaded area of FIG. 2, and the first slave device SLV1 is in output mode during a shaded area of FIG. 2. In other words, the master device MST occupies the data line SDA and the clock line SCL during the unshaded area, and the first slave device SLV1 occupies the data line SDA and the clock line SCL during the shaded area.

The master device MST outputs a start signal S to initiate data communication. The start signal S may be a data signal having a falling edge while the clock signal is high. The master device MST outputs a device address DVC_ADDR of the first slave device SLV1 and outputs a write signal W.

The device address DVC_ADDR may be 7 bits. The first slave device SLV1 receives the device address DVC_ADDR and outputs an ACK signal A.

The master device MST receives the ACK signal A and may further output first and second addresses ADDR1, ADDR2. The first and second addresses ADDR1, ADDR2 may be 8 bits. The first slave device SLV1 may further receive the first and second addresses ADDR1, ADDR2 and output an ACK signal A for each of them.

The master device MST may further output a restart signal rS, the device address DVC_ADDR and a read signal R. The first slave device SLV1 may further receive the device address DVC_ADDR and further output the ACK signal A.

The first slave device SLV1 may output data signals DAT0~DATn. Each of the data signals DAT0~DATn may be 8 bits. The master device MST may receive the data signals DAT0~DATn and output an ACK signal A for each of them.

A method of recovering a communication error occurring while the first slave device SLV1 is outputting one of the data signals DAT0~DATn will be explained in detail with reference to FIGS. 3A and 3B.

FIG. 3A is a diagram illustrating an example of data signals and clock signals when a communication error occurs in a data communication system constructed according to exemplary embodiments. FIG. 3B is a diagram illustrating another example of data signals and clock signals when a communication error occurs in a data communication system constructed according to exemplary embodiments. FIGS. 4A through 4D are circuit diagrams illustrating devices in an output mode to a data line and a clock line of a data communication system constructed according to exemplary embodiments.

Referring to FIGS. 1, 2, 3A and 4A, the data communication system is operated normally during a first duration P1. The first slave device SLV1 occupies the data line SDA and the clock line SCL during the first duration P1. The master device MST releases the data line SDA and the clock line SCL during the first duration P1.

The first slave device SLV1 normally outputs a first slave clock signal SLV1_SCL to the clock line SCL during the first duration P1. The first slave device SLV1 also normally outputs a first slave data signal SLV1_SDA to the data line SDA during the first duration P1. For example, the first slave device SLV1 outputs first through third data D1~D3.

Accordingly, signals on the clock line SCL and the data line SDA during the first duration P1 are the first slave clock signal SLV1_SCL and the first slave data signal SLV1_SDA respectively.

Referring to FIGS. 1, 2, 3A and 4B, a communication error occurs in a second duration P2. Once the communication error occurs, the first slave device SLV1 stays in its output mode to the data line SDA. Thus, the first slave data signal SLV1_SDA may stay low. Once the communication error occurs, the first slave device SLV1 may release the clock line SCL.

Accordingly, signals of the clock line SCL and the data line SDA during the second duration P2 are substantially the same as the first slave clock signal SLV1_SCL and the first slave data signal SLV1_SDA respectively.

Referring to FIGS. 1, 2, 3A and 4C, the master device MST may be in output mode to the clock line SCL during a third duration P3. In other words, the master device MST may occupy the clock line SCL during the third duration P3.

To recover the communication error, the master device MST outputs a master clock signal MST_SCL and a stop signal P. The master device MST outputs the master clock signal MST_SCL and the stop signal P repeatedly until the first slave device SLV1 is in input mode.

The first slave device SLV1 switches to input mode at the end of the third duration P3, to receive the ACK signal A. Also, master device MST maintains output mode after the end of the third duration P3.

Accordingly, the signal on the clock line SCL during the third duration P3 is substantially the same as the master clock signal MST_SCL.

Referring to FIGS. 1, 2, 3A and 4D, the master device MST remains in output mode to the data line SDA and the clock line SCL during a fourth duration P4. In other words, the master device MST occupies the clock line SCL and the data line SDA during the fourth duration P4. The first slave device SLV1 is in input mode to the data line SDA during the fourth duration P4.

The master device MST continues to output the master clock signal MST_SCL and the stop signal P during this time.

Accordingly, signals on the clock line SCL and the data line SDA during the fourth duration P4 are substantially the same as the master clock signal MST_SCL and the stop signal P respectively.

The first slave device SLV1 receives the stop signal P, and then switches to input mode. As a result, data can be retransmitted to the first slave device SLV1, so that the communication error is recovered.

Figure 3B:
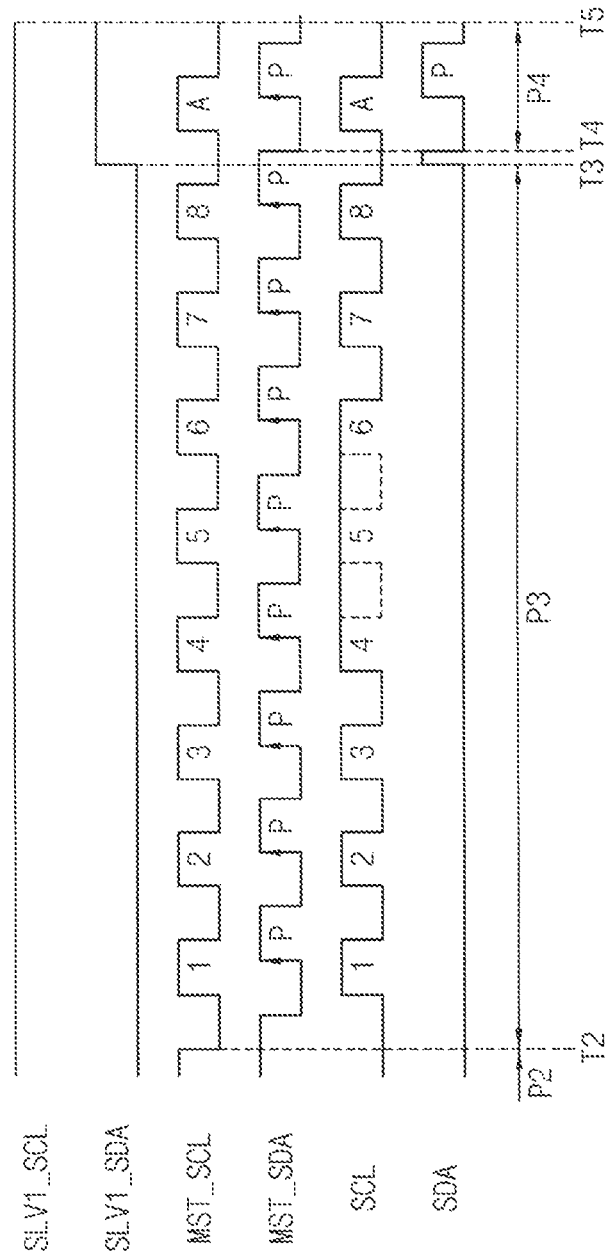
FIG. 3B is a diagram illustrating another example of data signals and clock signals when a communication error occurs in a data communication system constructed according to exemplary embodiments.
Figure 4A:
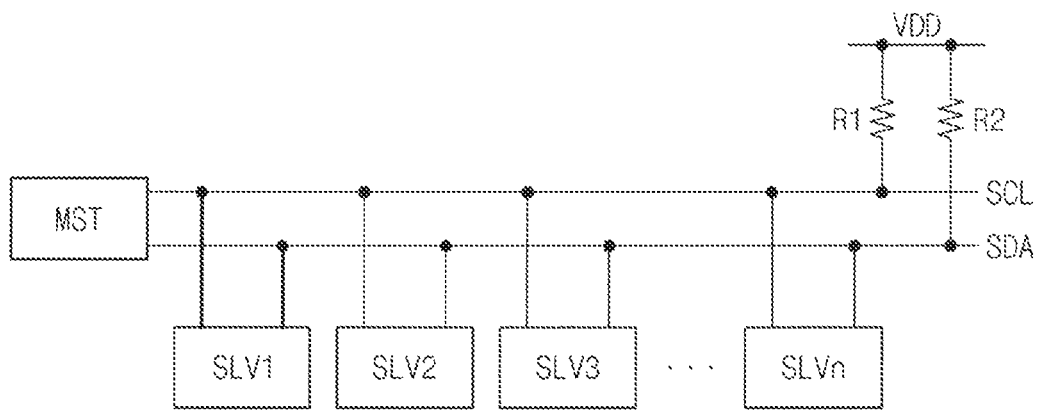
FIGS. 4A through 4D are circuit diagrams illustrating devices in an output mode to a data line and a clock line of a data communication system constructed according to exemplary embodiments.
Figure 4B:
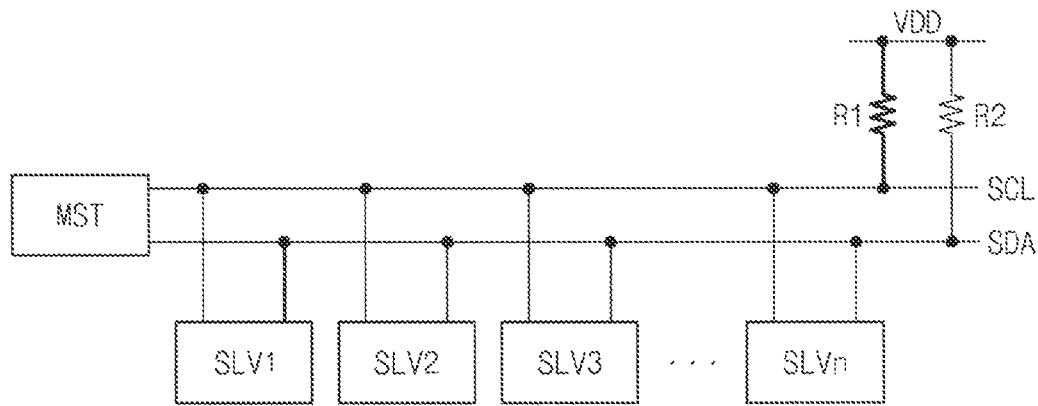
Figure 4C:
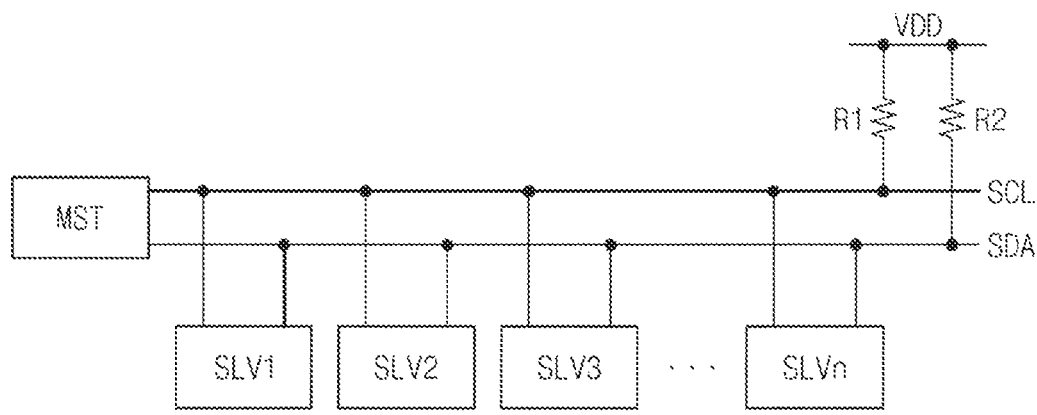
Figure 4D:
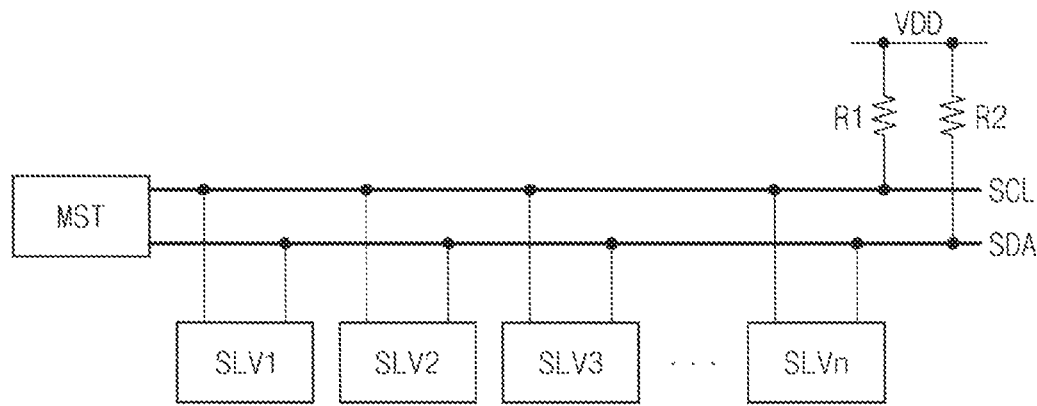

Referring to FIGS. 1, 2 and 3B, a communication error occurs right before the first slave device SLV1 outputs a byte of a data signal. In this case, the master device MST outputs the stop signal P nine times until the first slave device SLV1 enters input mode.

Accordingly, the master device MST outputs the stop signal P nine times at most to recover the communication error.

Figure 5:
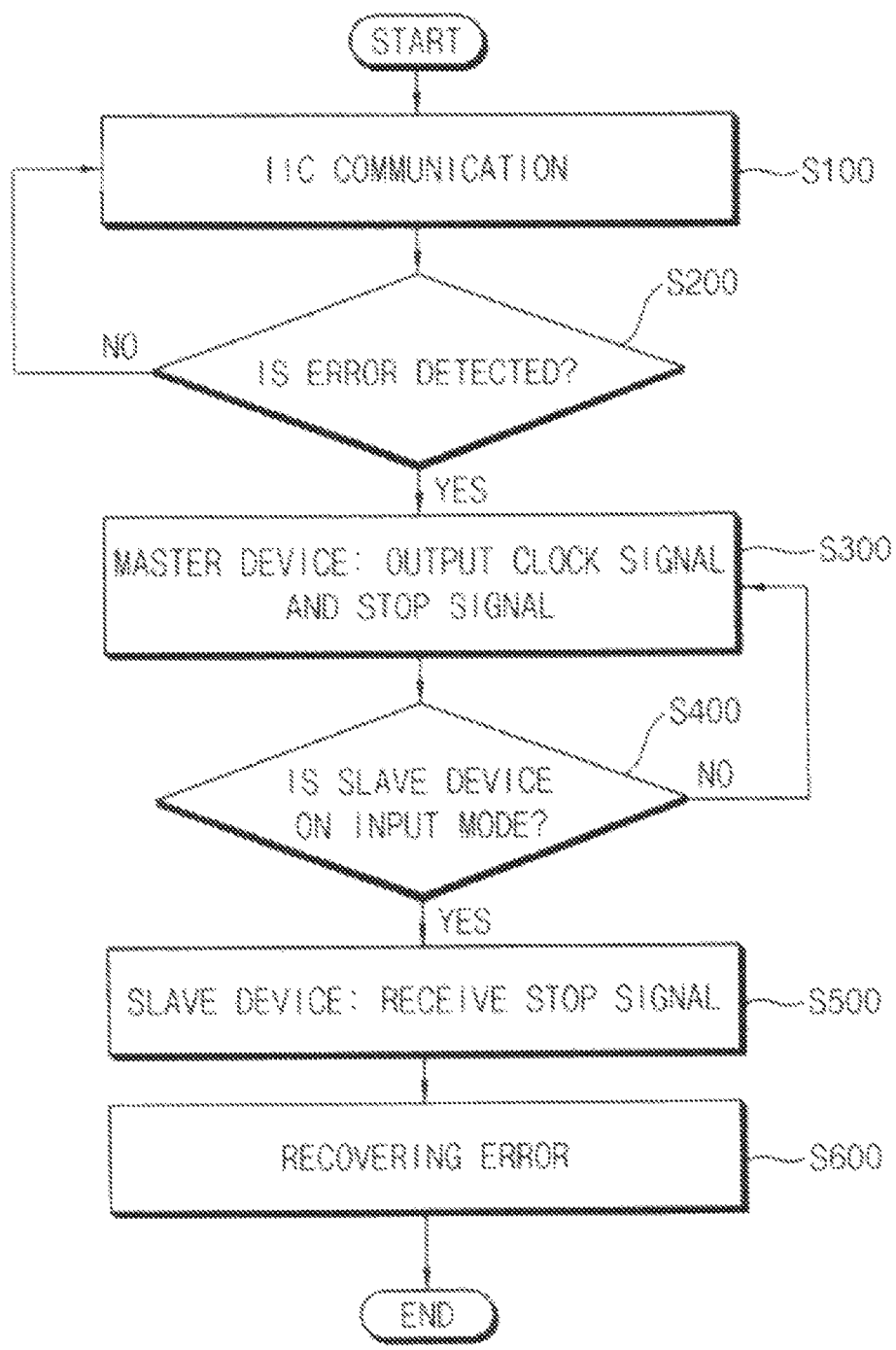
FIG. 5 is a flow chart illustrating a method of recovering an error in data communication according to exemplary embodiments.

FIG. 5 is a flow chart illustrating a method of recovering an error in data communication according to exemplary embodiments.

Referring to FIG. 5, a master device and a slave device perform an Inter-Integrated Circuit (IIC) communication between each other (S100). If a communication error is detected during the IIC communication (S200), the master device outputs a clock signal and a stop signal (S300). The master device outputs the clock signal and the stop signal repeatedly (S300) until the slave device is in an input mode (S400). Once the slave device is in its input mode, the master device transmits, and the slave device receives, the stop signal (S500). Finally, the communication error is recovered (S600), such as by retransmission of data.

FIG. 6 is a block diagram illustrating a display apparatus according to exemplary embodiments.

Referring to FIG. 6, the display apparatus includes a display panel 100 and a panel driver. The panel driver includes a timing controller 200, a gate driver 300, a gamma reference voltage generator 400, a data driver 500 and a first device 600.

The display panel 100 includes a display region for displaying an image, and a peripheral region adjacent to the display region.

The display panel 100 includes a plurality of gate lines GL, a plurality of data lines DL and a plurality of pixels electrically connected to the gate lines GL and the data lines DL. The gate lines GL extend in a first direction D1 and the data lines DL extend in a second direction D2 crossing the first direction D1.

In some exemplary embodiments, each of the pixels may include a switching element (not shown), a liquid crystal capacitor (not shown) and a storage capacitor (not shown). The liquid crystal capacitor and the storage capacitor may be electrically connected to the switching element. The pixels may be arranged in a matrix configuration.

The timing controller 200 receives input image data RGB and an input control signal CONT from an external device (not shown). The input image data RGB may include red image data R, green image data G and blue image data B. The input image data may include meta data about an image. The meta data may include an information about a color coordinate, a maximum luminance and a minimum luminance. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3 and a data signal DAT based on the input image data RGB and the input control signal CONT.

The timing controller 200 generates the first control signal CONT1 based on the input control signal CONT, where the first control signal CONT1 controls operations of the gate driver 300. The timing controller 200 then outputs the first control signal CONT1 to the gate driver 300. The first control signal CONT1 may include a vertical start signal and a gate clock signal.

The timing controller 200 generates the second control signal CONT2 also based on the input control signal CONT, where the second control signal CONT2 controls operations of the data driver 500. The timing controller 200 outputs the second control signal CONT2 to the data driver 500. The second control signal CONT2 may include a horizontal start signal and a load signal.

The timing controller 200 generates the data signal DAT based on the input image data RGB. The timing controller 200 outputs the data signal DAT to the data driver 500.

The timing controller 200 generates the third control signal CONT3 based on the input control signal CONT, where the third control signal CONT3 controls operations of the gamma reference voltage generator 400. The timing controller 200 outputs the third control signal CONT3 to the gamma reference voltage generator 400.

The gate driver 300 generates gate signals for driving the gate lines GL, in response to the first control signal CONT1 received from the timing controller 200. The gate driver 300 sequentially outputs the gate signals to the gate lines GL.

In some exemplary embodiments, the gate driver 300 may be directly mounted on the display panel 100, or may be connected to the display panel 100 in a tape carrier package (TCP) type configuration. Alternatively, the gate driver 300 may be integrated on the peripheral region of the display panel 100.

The gamma reference voltage generator 400 generates a gamma reference voltage VGREF in response to the third control signal CONT3 received from the timing controller 200. The gamma reference voltage generator 400 outputs the gamma reference voltage VGREF to the data driver 500. The level of the gamma reference voltage VGREF corresponds to grayscales of a plurality of pixel data included in the data signal DAT.

In some exemplary embodiments, the gamma reference voltage generator 400 may be disposed in the timing controller 200, or may be disposed in the data driver 500.

The data driver 500 receives the second control signal CONT2 and the data signal DAT from the timing controller 200, and receives the gamma reference voltage VGREF from the gamma reference voltage generator 400. The data driver 500 converts the data signal DAT to data voltages having analog levels based on the gamma reference voltage VGREF. The data driver 500 then outputs the data voltages to the data lines DL.

In some exemplary embodiments, the data driver 500 may be directly mounted on the display panel 100, or may be connected to the display panel 100 in a tape carrier package (TCP) type configuration. Alternatively, the data driver 500 may be integrated on the peripheral region of the display panel 100.

The first device 600 may generate first data. For example, the first device 600 may be one of a temperature sensor sensing temperature of the display panel 100, a light sensor sensing an amount of light of the display panel 100, and an analog to digital converter (ADC) or digital to analog converter (DAC) measuring current or voltage of the display panel 100.

The first device 600 may perform data communication with the timing controller 200 through a serial data line SDA and a serial clock line SCL. The data communication may be an Inter-Integrated Circuit (IIC) communication. In this case, the first device 100 may be a slave device, and the timing controller 200 may be a master device.

If a communication error occurs while the first device 600 is in output mode, the timing controller 200 may output a stop signal to the serial data line SDA repeatedly until the first device switches to input mode.

The above described embodiments may be used in a data communication system performing data communication. The above described embodiments may also be used in a display apparatus and/or a system including the display apparatus, such as a mobile phone, a smart phone, a personal digital assistant (PDA), a portable media player (PMP), a digital camera, a digital television, a set-top box, a music player, a portable game console, a navigation device, a personal computer (PC), a server computer, a workstation, a tablet computer, a laptop computer, a smart card, a printer, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims. Various features of the above described and other embodiments can thus be mixed and matched in any manner, to produce further embodiments consistent with the invention.

What is claimed is:
1. A method of recovering an error in data communication, the method comprising:
performing data communication between a first device and a second device through a data line and a clock line;
detecting a communication error in the data communication when the first device is in an output mode; and in response to the detecting, outputting, by the second device, a stop signal to the data line repeatedly until the first device is in an input mode.

2. The method of claim 1, wherein the first device is configured to output data to the data line when the first device is in the output mode.

3. The method of claim 1, wherein the first device is configured to receive data from the data line when the first device is in the input mode.

4. The method of claim 1, wherein the outputting further comprises:
    outputting, by the second device, a clock signal to the clock line.

5. The method of claim 4, wherein the outputting further comprises:
    outputting, by the second device, the stop signal to the data line in synchronous manner with clock pulses of the clock signal.

6. The method of claim 1, wherein the outputting further comprises:
    periodically and repeatedly outputting stop pulses during a first duration after the communication error is detected.

7. The method of claim 1, further comprising:
    receiving, by the first device, the stop signal so as to switch from the output mode to the input mode.

8. The method of claim 1, wherein the data communication is an Inter-Integrated Circuit (IIC) communication.

9. The method of claim 8, wherein the first device is a slave device and the second device is a master device.

10. A data communication system comprising:
    first and second devices configured to perform data communication with each other through a data line and a clock line,
    wherein, in response to an error in the data communication while the first device is in an output mode, the second device is configured to output a stop signal to the data line repeatedly until the first device is switched to an input mode.

11. The data communication system of claim 10, wherein the first device is configured to output data to the data line when the first device is in the output mode.

12. The data communication system of claim 10, wherein the first device is configured to receive data from the data line when the first device is in the input mode.

13. The data communication system of claim 10, wherein the data communication is an Inter-Integrated Circuit (IIC) communication.

14. The data communication system of claim 13, wherein the first device is a slave device and the second device is a master device.

15. A display apparatus comprising:
    a first device configured to generate data and configured to perform data communication with a timing controller through a data line and a clock line;
    a timing controller configured to, in response to an error in the data communication while the first device is in an output mode, output a stop signal to the data line repeatedly until the first device is switched to an input mode; and
    a display panel configured to display an image based on the data.

16. The display apparatus of claim 15, wherein the first device is configured to output data to the data line when the first device is in the output mode.

17. The display apparatus of claim 15, wherein the first device is configured to receive data from the data line when the first device is in the input mode.

18. The display apparatus of claim 15, wherein the data communication is an Inter-Integrated Circuit (IIC) communication.

19. The display apparatus of claim 18, the first device is a slave device and the second device is a master device.

20. The display apparatus of claim 15, wherein the first device is one of a temperature sensor configured to sense a temperature of the display panel, a light sensor configured to sense an amount of light of the display panel, an analog to digital converter (ADC) and a digital to analog converter (DAC) for facilitating a measuring of a current or a voltage of the display panel.

* * * * *